United States Patent [19]
DiGiovanni et al.

[11] Patent Number: 5,259,046
[45] Date of Patent: Nov. 2, 1993

[54] ARTICLE COMPRISING AN OPTICAL WAVEGUIDE CONTAINING A FLUORESCENT DOPANT

[75] Inventors: David J. DiGiovanni, Montclair, N.J.; Ashish M. Vengsarkar, Allentown, Pa.; Kenneth L. Walker, New Providence, N.J.

[73] Assignee: AT&T Bell Laboratories, Murray Hill, N.J.

[21] Appl. No.: 955,002

[22] Filed: Oct. 1, 1992

[51] Int. Cl.$^5$ ................................. G02B 6/00
[52] U.S. Cl. .................... 385/12; 385/123; 385/129; 385/141; 385/142
[58] Field of Search ............... 385/12, 14, 122, 123, 385/124, 126, 127, 129, 130, 141, 142

[56] References Cited

U.S. PATENT DOCUMENTS

| | | | |
|---|---|---|---|
| 4,666,247 | 5/1987 | MacChesney et al. | 350/96.34 |
| 4,923,279 | 5/1990 | Ainslie et al. | 350/96.30 |
| 5,039,190 | 8/1991 | Blonder et al. | 385/142 |
| 5,058,976 | 10/1991 | DiGiovanni et al. | 359/173 |
| 5,061,857 | 10/1991 | Thompson et al. | 385/12 |
| 5,107,538 | 4/1992 | Benton et al. | 385/130 |

OTHER PUBLICATIONS

"The Design of Erbium-Doped Fiber Amplifiers", by B. Pedersen et al., *Journal of Lightwave Technology*, vol. 9, No. 9, Sep. 1991, pp. 1105-1112.
"Three-level Fiber Laser Amplifier: A Theoretical Model", by J. R. Armitage, *Applied Optics*, vol. 27, No. 23, Dec. 1, 1988, pp. 4831-4836.
"Design Optimization for Efficient Erbium-Doped Fiber Amplifiers", by E. Desurvire et al., *Journal of Lightwave Technology*, vol. 8, No. 11, Nov. 1990, pp. 1730-1741.
"Modeling of Gain in Erbium-Doped Fiber Amplifiers", by A. A. M. Saleh et al., *IEEE Photonics Technology Letters*, vol. 2, No. 10, Oct. 1990, pp. 714-717.
"Optical Waveguides with Novel Compositions", by J. B. MacChesney et al., paper WH5, *Proceedings of the Optical Fiber Conference 1985*, p. 100, (1985).

*Primary Examiner*—Frank Gonzalez
*Attorney, Agent, or Firm*—Eugen E. Pacher

[57] ABSTRACT

Optical waveguide amplifiers and lasers having a novel fluorescent dopant distribution are disclosed. Exemplarily, in a Si-based optical fiber the fluorescent dopant (e.g., Er) has an annular distribution, with the concentration maximum not at the center of the core but typically between the center and the core/cladding interface. The novel waveguides can be relatively insensitive to variations in cut-off wavelength and/or modal distribution of pump power.

10 Claims, 4 Drawing Sheets

ARTICLE COMPRISING AN OPTICAL WAVEGUIDE CONTAINING A FLUORESCENT DOPANT

FIELD OF THE INVENTION

This invention pertains to articles that comprise an optical waveguide-based fluorescent device. More particularly, it pertains to such articles (e.g., optical communication systems) that comprise a silica-based optical waveguide whose core region comprises a fluorescent dopant, typically rare earth ions, exemplarily $Er^{3+}$.

BACKGROUND OF THE INVENTION

It is known that a silica-based optical fiber whose core region is doped with an appropriate luminescent (typically rare earth) species can serve as optical amplifier for signal radiation of an appropriate wavelength, or as a coherent radiation source, a laser. See, for instance, U.S. Pat. Nos. 4,923,279 and 5,058,976, both incorporated herein by reference.

The '279 patent teaches that it is advantageous to provide a fiber with the highest concentration of the luminescent species (e.g., Er) at the center of the core, since such a distribution results in improved gain performance for a given pump power.

The '976 patent discloses Er-doped fiber designs which can provide fiber having, inter alia, low amplification threshold and noise. Methods of making such fiber are also disclosed. See also B. Pedersen et al., *Journal of Lightwave Technology*, Vol. 9, p. 1105 (1991), which suggests fiber designs for single mode operation.

Although optical fiber amplifiers in tests have already attained quite high performance levels, currently known designs do not yet optimally satisfy all requirements of practical optical fiber communication systems. For instance, currently known designs for 1.48 $\mu$m pumped amplifiers are relatively sensitive to variations in cut-off wavelength of the fiber. This is disadvantageous, since it is typically difficult to control the cut-off wavelength of single mode optical fiber to within better than $\pm 5\%$. It is particularly difficult to control the cut-off wavelength to better than about $\pm 5\%$ in the small core, highly doped fibers typically used as optical amplifiers. As a further example, currently known designs for 0.98 $\mu$m pumped amplifiers are relatively sensitive to the distribution of the pump power among the spatial modes of the (single mode for the 1.5 $\mu$m signal radiation) fiber. For instance, the effect of launching the higher-order $LP_{11}$ mode has been investigated by J. R. Armitage, *Applied Optics*, Vol. 27, p. 4831 (1991). For fibers with an $LP_{11}$ cut-off wavelength $\lambda_c > 980$ $\mu$m, Desurvire et al. [(*Journal of Lightwave Technology*, Vol. 8, p. 1730 (1990)] have demonstrated a variation of as much as 20 dB in amplifier gain when the pump power ($\lambda_p = 0.98$ $\mu$m) shifts from the $LP_{01}$ to the $LP_{11}$ mode in a fiber with $\epsilon = 0.25$, ($\epsilon = r_{Er}/a$, where $r_{Er}$ is the effective radius of the Er-doped inner core region, and a is the effective radius of the core. See also FIG. 1).

In view of the great commercial significance of optical waveguide amplifiers and lasers, it would be highly desirable to have available a waveguide design which overcomes (or is at least less subject to) the above discussed shortcomings. This application discloses such a design, and waveguides (including silica-based Er-doped optical fibers and planar waveguides) that embody the inventive design.

THE INVENTION

Figure 1:
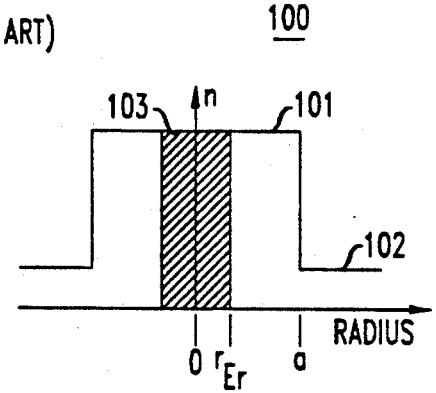
FIG. 1 schematically shows the refractive index profile and Er-distribution of a prior art fiber.

In a broad aspect the invention is embodied in an article (e.g., an optical communication system) that comprises an optical waveguide that is suitable for forming a fluorescent device (i.e., an optical amplifier, a laser or a superluminescent source), with the fluorescent dopant distribution in the waveguide being such that the fluorescent device is relatively insensitive to variations in cut-off wavelength, or such that the device is relatively insensitive to variations in pump power modal distribution.

The invention may be embodied in planar as well as in circular optical waveguides. The latter are commonly referred to as "optical fiber". Both types of waveguides comprise a "core" that has relatively high refractive index and a "cladding" that has relatively low refractive index and that at least partially surrounds the core.

More particularly, an optical waveguide according to the invention comprises a core and a cladding that at least partially surrounds the core and has an interface therewith. The core contains the fluorescent dopant (typically a rare earth such as Er, Nd, Yb, Sm, Tm and Pr) and has a center. If the waveguide is an optical fiber, then the distribution of the fluorescent dopant in the core is an annular distribution, with the concentration of the fluorescent dopant being substantially higher at a radius $r \neq 0$ ($0 < r \leq a$) than it is at the core center, i.e., at $r = 0$. Typically, the annular distribution of the luminescent dopant is such that $0.5 \leq r_2/a \leq 1$ and $0.2 \leq \epsilon' \leq 0.5$, where $\epsilon' = (r_2 - r_1)/a$, $r_1$ and $r_2$ are, respectively the effective inner and outer radius of the annular distribution, and a is the equivalent radius of the core. The effective "radii" of the annular distribution are those radii at which the luminescent dopant concentration is 50% of the maximum luminescent dopant concentration. The equivalent core radius is the radius of the equivalent step index core.

If the waveguide is a planar waveguide, then the fluorescent dopant distribution is such that the dopant concentration is substantially higher at a value of $y \neq 0$ ($0 < |y| \leq a$) than it is at $y = 0$, where y is the spatial coordinate normal to the plane of the waveguide, with $y = 0$ corresponding to the center plane of the core region. The luminescent species distribution typically is such that $0.5 \leq |y_2/a| \leq 1$ and $0.2 \leq \epsilon'' \leq 0.5$, where $\epsilon'' = |y_2 - y_1|/a$, where $y_1$ and $y_2$ are, respectively, the inner and outer effective normal distance of the luminescent dopant distribution from the center plane of the core, and $2a$ is the effective width of the core. The "effective" distances are those distances at which the luminescent dopant concentration is 50% of the maximum dopant concentration.

The invention may be embodied in any suitable glass system, but silica-based waveguides, especially silica-based fibers, are currently of greatest commercial interest. Furthermore, the invention may be practiced with any suitable fluorescent dopant, but rare earth dopants are currently of most commercial interest. In particular, for communication systems that use signal radiation of about 1.5–1.6 $\mu$m (e.g., 1.56 $\mu$m), Er is currently the dopant of greatest commercial interest.

For the sake of concreteness the remainder of the discussion will be in terms of a currently preferred embodiment, namely, a silica-based single mode optical fiber comprising Er as the fluorescent dopant, with the signal wavelength being in the approximate range 1.52–1.57 $\mu$m.

FIG. 1 schematically shows the refractive index profile and Er distribution of a prior art fiber 100, showing core region 101, cladding 102, and Er-doped core region 103.

Figure 2:
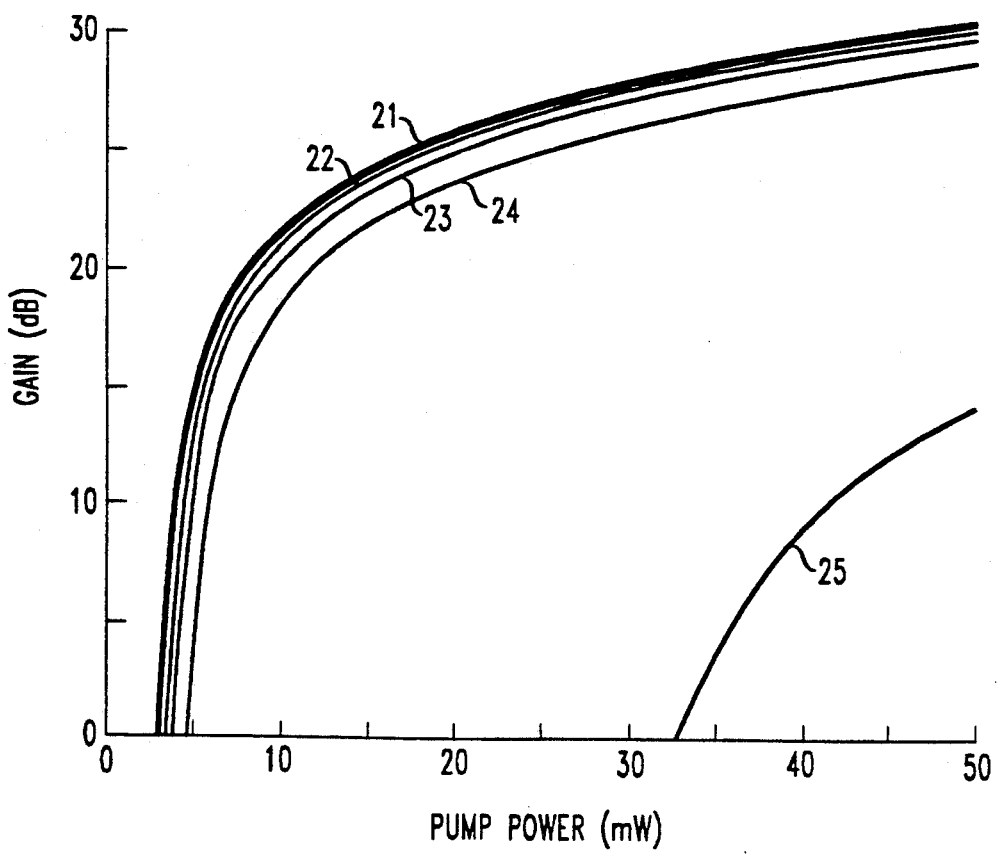
FIG. 2 gives the computed relationship between amplifier gain and pump power, as a function of the fraction of pump power in the $LP_{11}$ mode, for a prior art fiber.

FIG. 2 shows the computed gain vs. 0.98 $\mu$m pump power for a prior art optical amplifier comprising fiber as shown in FIG. 1. The following fiber parameters were assumed: refractive index difference $\Delta n = 0.019$, and effective core diameter $2a = 3.56$ $\mu$m. The computation used a model due to A. A. M. Saleh et al., *IEEE Photonics Technology Letters*, Vol. 2, p. 714 (1990). The parameter $\eta$ of FIG. 2 is the fraction of pump power present in the $LP_{11}$ mode. Curve 21 pertains to $\eta = 0$ and $\eta = 0.2$. Curves 22–25 pertain to $\eta = 0.4, 0.6, 0.8$ and $1.0$, respectively. As can be readily seen from FIG. 2, the gain of the prior art amplifier is quite strongly dependent on the distribution of the pump power between the waveguide modes.

Figure 3:
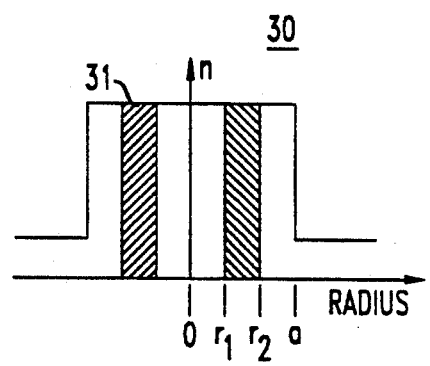
FIG. 3 schematically depicts the refractive index profile and Er-distribution of an exemplary fiber according to the invention.

FIG. 3 schematically shows the refractive index profile and Er-distribution of a fiber 30 according to the invention, with numeral 31 referring to the annular Er-doped region having inner and outer radii $r_1$ and $r_2$, respectively. If radius values are replaced by analogous values of the previously defined coordinate z, then FIG. 3 can represent an exemplary planar waveguide according to the invention.

Figure 4:
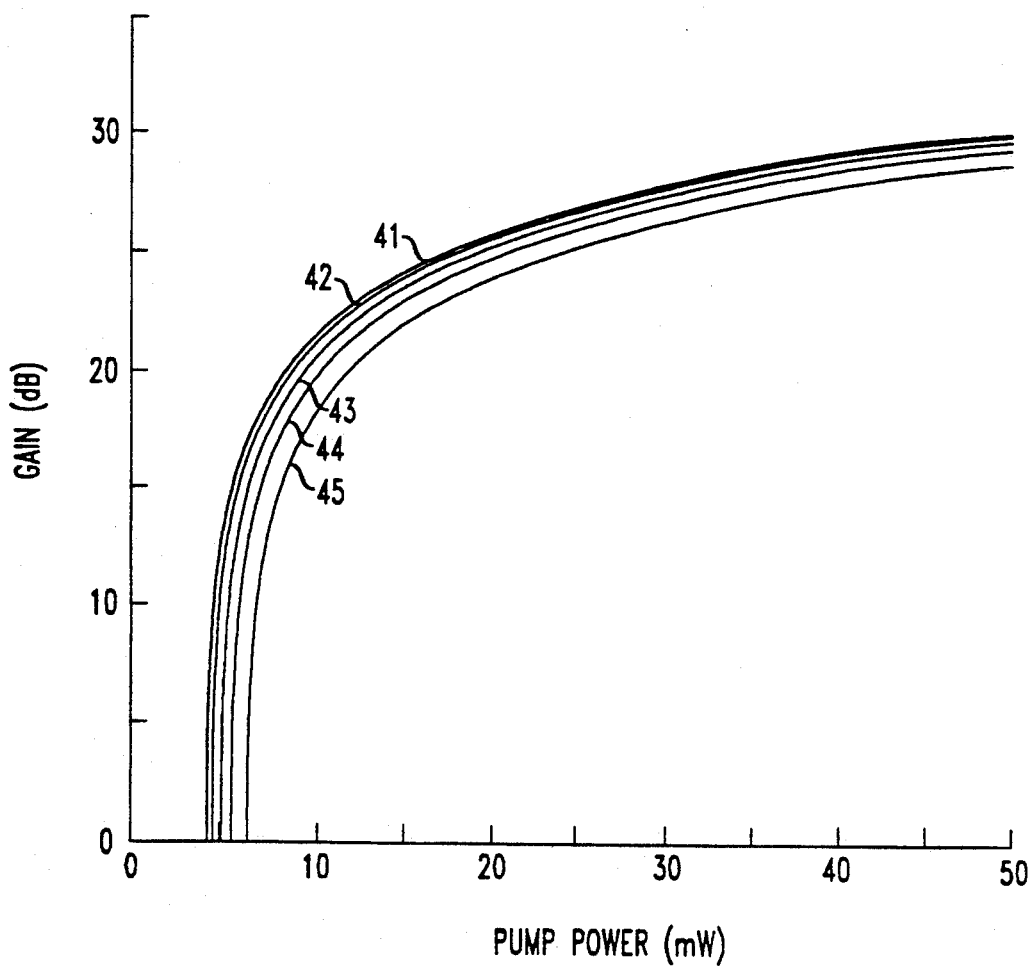
FIG. 4 gives the same computed relationship as in FIG. 2, but for a fiber according to the invention.

FIG. 4 shows the computed gain for an optical amplifier according to the invention, with $\eta$ having the same meaning as in FIG. 2. Curve 41 pertains to $\eta = 0$ and $0.2$. Curves 42–45 pertain to $\eta = 0.4, 0.6, 0.8$ and $1.0$, respectively. The values of $r_1$ and $r_2$ are $0.7a$ and $0.95a$, respectively. A design having approximately (e.g., within $\pm 10\%$ for $r_1$, within $-10\%$ and a for $r_2$) these values for $r_1$ and $r_2$ results in robustness in amplifier behavior against changes in fractional pump power in the $LP_{11}$ mode and is currently preferred for 0.98 $\mu$m pumped amplifiers.

The appropriate values of $r_1$ and $r_2$ were determined by means of evaluations of the overlap integrals of the Er profile and the $LP_{01}$ and $LP_{11}$ modes, satisfying the requirement that the two overlap integrals be equal. However, satisfaction of this requirement is not a limitation on fiber designs according to the invention, and other requirements may be appropriate under special circumstances. The referred-to overlap integral is $$\int_0^{2\pi} \int_0^\infty E(r) \, \psi_{lm}^2(r) r \, dr \, d\phi,$$

where $E(r)$ is the Er-distribution and $\psi_{lm}^2$ is the model power envelope of the $LP_{lm}$ mode at the wavelength of interest, e.g., at 0.98 $\mu$m. The variables have their customary meaning.

For pump wavelengths greater than the cut-off wavelength of the amplifier fiber, only a single mode of pump radiation can propagate. In such a case the considerations that underlie FIGS. 2 and 4 are of no concern. However, we have found that fibers according to the invention can provide robustness in amplifier behavior with respect to changes in cut-off wavelength. Such changes can be due to changes in the core/cladding normalized index difference $\Delta n$ and/or changes in core radius $a$. Real fiber typically exhibits at least minor variations in these (and other) parameters.

Appropriate values of $r_1$ and $r_2$ can be determined by, e.g., minimizing the value of the derivative with respect to the cut-off wavelength of the above disclosed overlap integral (with $\psi_{lm} = \psi_{01}$).

Figure 5:
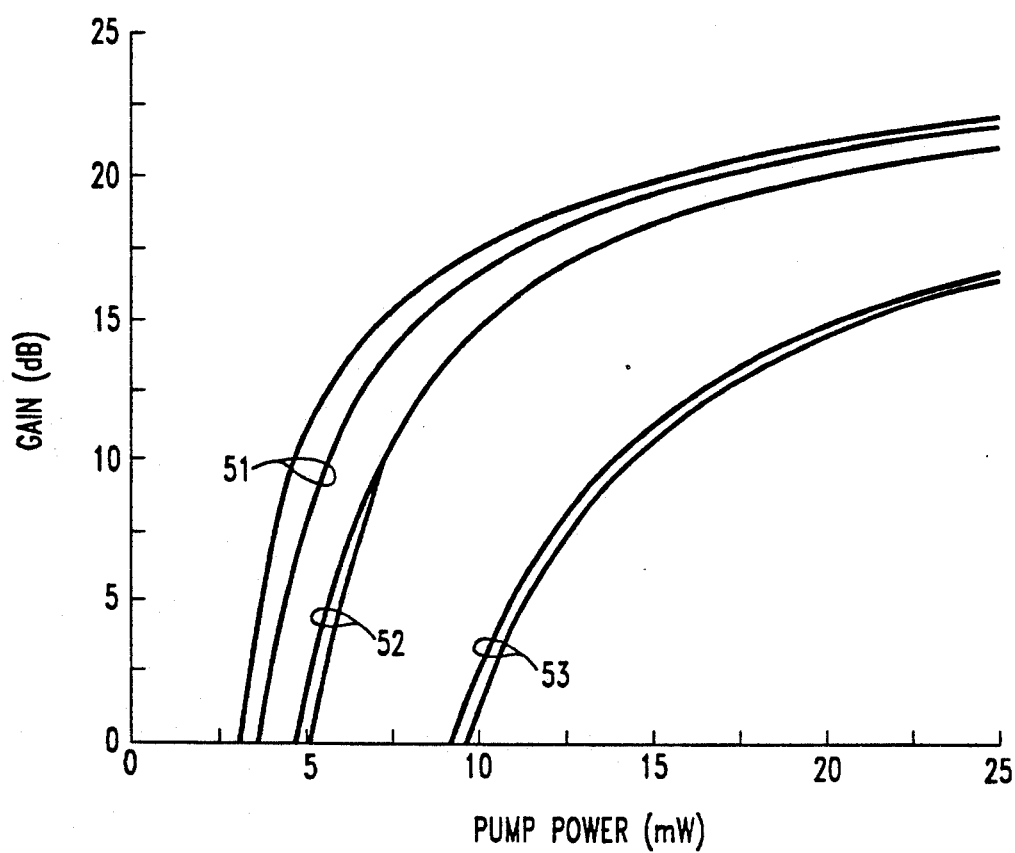
FIG. 5 gives the computed relationships between amplifier gain and pump power, assuming 10% variations in the cut-off wavelength, for a prior art fiber and for two fibers according to the invention.

FIG. 5 shows computed values of amplifier gain as a function of pump power, for three different Er-distributions, assuming in each case a 10% change in $\lambda_c$. All three Er distributions have $\epsilon' = 0.25$. Numeral 51 designates the prior art result (Er-distribution of the type shown in FIG. 1, i.e., $r_1 = 0$), numerals 52 and 53 designate results for fiber according to the invention, with 52 pertaining to a fiber with Er-distribution of the type shown in FIG. 3 ($r_1 > 0$, $r_2 < a$), and 53 to a fiber with Er-distribution that extends to the core-cladding interface ($r_1 > 0$, $r_2 = a$). The values of $r_1$ are 0, 0.37, 0.75, respectively, and those of $r_2$ are 0.25, 0.62 and 1, respectively, all in units of $a$.

The prior art amplifier shows a drop in gain with a decrease in $\lambda_c$. The amplifier with Er at the core-cladding interface shows a marginal increase in gain (at the expense of relatively high threshold power and relatively low overall gain). The novel design with $r_2 \neq a$ shows a minimum variation in performance, resulting in improved manufacturability. Currently preferred embodiments of the invention have $r_2/a$ in the range $0.62 \pm 10\%$ and $\epsilon'$ in the range $0.25 \pm 10\%$.

In view of the law of Nature that there is no free lunch, it will come as no surprise to those skilled in the art that practice of the invention generally involves a trade-off. Typically, amplifiers according to the invention have somewhat lower gain and higher threshold power than comparable prior art amplifiers. The annular fluorescent dopant profile disclosed herein thus will typically be most appropriate in situations where repeatable, consistent device performance is important.

Figure 6:
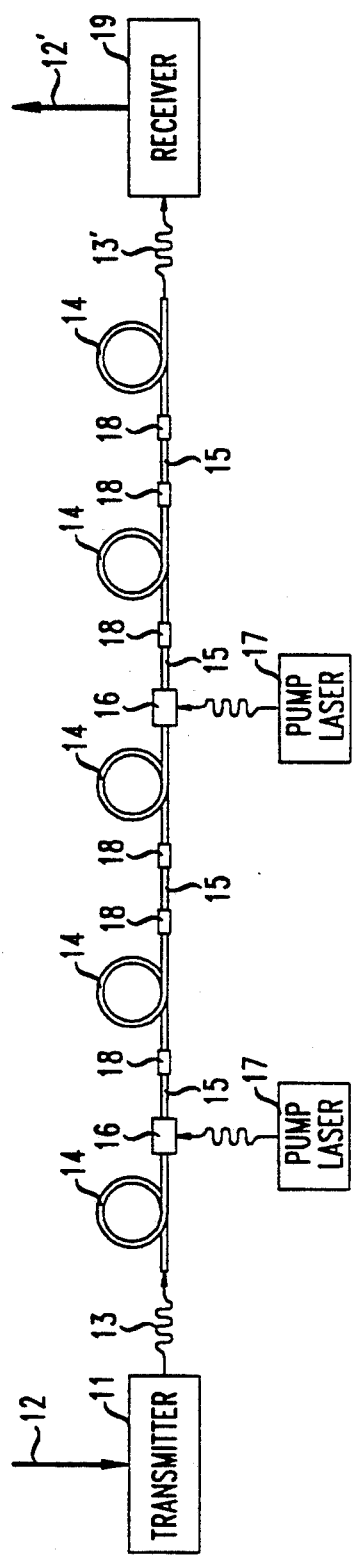
FIG. 6 schematically depicts an exemplary article according to the invention, namely, an optical fiber communication system that utilizes optical amplifiers according to the invention.

FIG. 6 schematically depicts an optical fiber communication system 10 that can advantageously comprise fiber according to the invention. The system comprises transmitter 11 and receiver 19, with a length of optical fiber (comprising a multiplicity each of transmission fibers 14 and amplifier fibers 15) therebetween. The output radiation 13 of the transmitter is modulated in accordance with signal 12 and is coupled into the optical fiber, is transmitted therethrough and amplified, and radiation 13' is detected in receiver 19, with output 12' available for utilization. The system further comprises pump lasers 17 whose output radiation is coupled into the optical fiber using known means 16, e.g., directional couplers. Known means 18 can be used to couple amplifier fibers 14 and transmission fibers 15. Means 16 cause pump radiation to travel "down stream" in the amplifier fiber. At least one of the amplifier sections comprises fiber according to the invention.

Optical fiber according to the invention can be made by any suitably adapted conventional method, including MCVD and VAD. For well known reasons, the Er-containing annular region of an Er-doped silica-based fiber according to the invention advantageously also contains Al and, possibly, Ge. In currently preferred fiber according to the invention, the maximum Al concentration in the core is less than 6 mole %, in order to minimize Er diffusion.

EXAMPLE

An Er-doped silica-based fiber preform is produced by MCVD as follows. On the inside of a conventional fused silica substrate tube is deposited cladding material in conventional fashion. This is followed by deposition of the core material, namely, three passes of Ge-doped silica, followed by three passes of Ge-Al-Er-doped silica, followed by one pass of Ge-doped silica, the Ge-concentration selected such that $\Delta n \sim 0.019$ results. The flow conditions are as follows. 0.58 g/minute of $SiCl_4$ is delivered by flowing 80 $cm^3$/minute $O_2$ through a 37° C. bubbler. Similarly, 0.62 g/minute of $GeCl_4$ is delivered by flowing 300 $cm^3$/minute $O_2$ through a 37° C. bubbler. Furthermore, 200 $cm^3$/minute He and 2000 $cm^3$/minute $O_2$ are delivered to the substrate tube. Flowing 4 $cm^3$/minute $Cl_2$ over Al metal at 300° C. results in formation of 0.016 g/minute $AlCl_3$. The thus produced $AlCl_3$ is flowed over $ErCl_3$ at 775° C., and delivered to the substrate tube.

The first three layers are deposited at 1900° C. and 10 cm/minute traverse speed, with $Cl_2$ flow off and $ErCl_3$ cold. The next three layers are deposited at the same temperature and traverse speed, with $Cl_2$ flow on and $ErCl_3$ at 775° C. The last layer is deposited at the same temperature and traverse speed, with the $Cl_2$ flow off and $ErCl_3$ cold. After completion of core deposition the tube is collapsed and overclad to the final diameter which will yield the desired cut-off wavelength (1.1 μm), all in conventional fashion. The process results in an annular Er-distribution, with $r_1 \sim 0.37a$ and $r_2 \sim 0.75a$. The concentration of $Al_2O_3$ is about 1.7 mole %. Fiber is drawn from the preform in conventional fashion. The fiber exhibits a loss of about 5 dB/m at a wavelength of 1.53 μm, indicative of a Er doping level of about 250 ppm. For a more detailed description of Al- and Er-doping see, for instance, U.S. Pat. No. 4,666,247 and J. B. MacChesney et al., "Proceedings of the Optical Fiber Conference 1985", paper WH5, p. 100 (1985), respectively.

We claim:

1. An article that comprises an optical waveguide suitable for forming a fluorescent device, said optical waveguide having a core and a cladding that at least partially surrounds the core and has an interface therewith, said core containing a fluorescent dopant and having a center;

characterized in that the concentration of the dopant is substantially higher at said interface or intermediate the core center and said interface than it is at the core center.

2. An article according to claim 1, wherein the waveguide is an optical fiber, the core has effective radius a and comprises an inner region that contains the core center and an outer region that contactingly surrounds the inner region, said outer region containing the highest concentration of said fluorescent dopant, with the effective inner and outer radii of the outer region designated $r_1$ and $r_2$, respectively, with $r_1 \neq 0$ and $r_2 \leq a$.

3. An article according to claim 2, wherein $0.5 \leq r_2/a \leq 1$, and wherein $0.2 \leq \epsilon' \leq 0.5$, where $\epsilon' = (r_2 - r_1)a$.

4. An article according to claim 3, wherein the waveguide is a silica-based optical fiber, and wherein the luminescent dopant is selected from the group consisting of Er, Nd, Sm, Yb, Pr, and Tm.

5. An article according to claim 4, wherein the luminescent dopant is Er.

6. An article according to claim 5, wherein the core comprises Al, with the maximum $Al_2O_3$ concentration in the core being at most 6 mole %.

7. An article according to claim 4, wherein the article is an optical fiber communication system adapted for operation at a signal wavelength $\lambda_s$, said system comprising a transmitter means and a receiver means, said transmitter and receiver means being signal-transmissively connected by optical fiber transmission means that comprise at least one optical amplifier means that comprise said silica-based optical fiber and that further comprises pump radiation source means, and means for coupling the pump radiation of wavelength $\lambda_p < \lambda_s$ into said silica-based optical fiber, associated with said silica-based optical fiber being a cut-off wavelength $\lambda_{co}$.

8. An article according to claim 7, wherein $\lambda_{co} < \lambda_p$, wherein $r_2/a$ is in the range $0.62 \pm 10\%$, and wherein $\epsilon'$ is in the range $0.25 \pm 10\%$.

9. An article according to claim 7, wherein $\lambda_{co} > \lambda_p$, wherein $r_1/a$ is in the approximate range $0.7 \pm 10\%$, and $r_2/a$ is in the approximate range 0.855 to 1.

10. An article according to claim 1, wherein the optical waveguide is a planar optical waveguide.

* * * * *